F. J. RABBETH & J. E. ATWOOD.
Spindle for Spinning-Machines.
No. 6,456. Reissued May 25, 1875.
FIG. I.
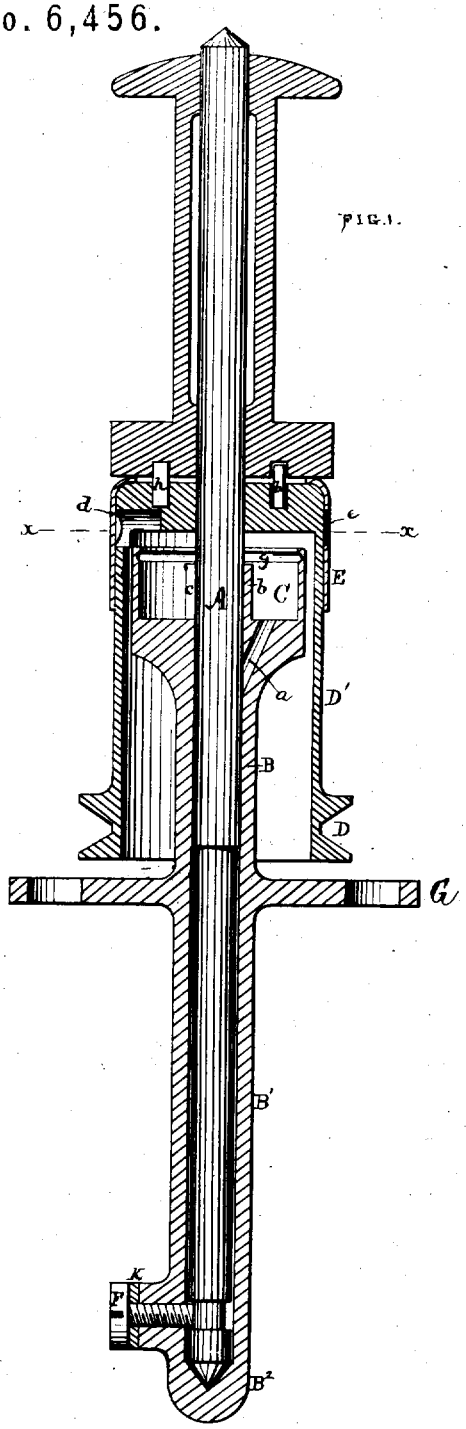
FIG. II.
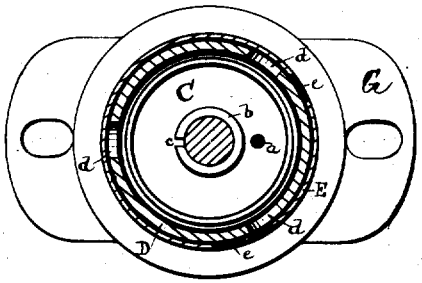
WITNESSES:
F. B. Townsend.
Philip F. Lazier
INVENTORS:
Francis J. Rabbeth
John E. Atwood,
By
Attorney

UNITED STATES PATENT OFFICE.

FRANCIS J. RABBETH, OF PAWTUCKET, RHODE ISLAND, AND JOHN E. ATWOOD, OF WILLIMANTIC, CONNECTICUT, ASSIGNORS, BY MESNE ASSIGNMENTS, TO FRANCIS J. RABBETH AND FALES, JENKS & SONS.

IMPROVEMENT IN SPINDLES FOR SPINNING-MACHINES.

Specification forming part of Letters Patent No. 63,561, dated April 2, 1867; reissue No. 6,456, dated May 25, 1875; application filed January 25, 1875.

*To all whom it may concern:*

Be it known that we, FRANCIS J. RABBETH, formerly of Ilion, in the State of New York, now of Pawtucket, in the county of Providence and State of Rhode Island, and JOHN E. ATWOOD, of Willimantic, in the county of Windham and State of Connecticut, have invented certain new and useful Improvements in Spindles for Spinning-Frames; and we do hereby declare that the following specification, taken in connection with the drawings furnished and forming a part of the same, is a clear, full, and accurate description thereof.

The spindle, in connection with which we herein describe our improvements, belongs to the well-known class in which the bolster for the spindle is connected to a tube below, which forms an oil-reservoir at its bottom, an illustration of which is found in the Letters Patent of the United States granted to JOHN E. ATWOOD September 18, 1866.

One portion of our present invention consists in the combination of an upwardly-extended tubular bolster, with a live spindle, which extends above the bolster, for receiving the bobbin, and a sleeved whirl, which encircles the bolster, and drives the spindle attached to it, and sustains and drives the bobbin. Another portion of our invention consists in providing the tube, which contains the spindle and supports it and its accompanying parts, with a flanged bracket, which is provided with bolt-holes, whereby the tube and spindle may be readily adjusted in a proper position on the spindle-rail. Another portion of our invention consists in the combination of the spindle, of an oil-box closed at the bottom, surrounding the spindle, and connected, by an extension, to the lower end of the bolster, and of an oil-cup, formed at the upper end of the bolster, and surrounding the spindle, with a downward passage leading from the bottom of the oil-cup to a point within the bearing of the bolster at some distance below the bottom of the cup, to enable the oil, which is carried up through the bolster by the rotation of the spindle, and overflows into the oil-cup, to flow back again through the downward passage, thus insuring a circulation of the oil without permitting it to escape and be wasted. Another portion of our invention consists in an arrangement of the oil reservoir or cup mounted on and surrounding the bolster-extension for the spindle, said extension being slotted to convey oil to and around the spindle, and said cup being provided with a downwardly-extending duct, for the passage of oil to the lower part of the bolster-bearing, and thence to the oil-tube below; and, also, the combination, with a receptacle for oil surrounding the bolster-bearing, and arranged to supply it with oil, of a sleeve-whirl, which surrounds the bolster, and is provided with a lateral induction oiling-passage communicating with said receptacle; and, also, in providing a guard for closing said lateral passage; and our invention still further consists in the combination, with the tube and spindle, of a packing for preventing the escape of oil, and a set-screw for holding the packing in position and preventing the spindle from rising.

Referring to the drawing, A represents a live spindle. It is mounted in a tube, $B^1$, which contains a step, $B^2$, at its bottom, and a bolster-bearing, B, near its upper end. The lower part of the tube $B^1$ forms an oil-box, closed tightly at the bottom, surrounding the spindle A, and suitable to contain oil without allowing it to escape downward. The extension of the tube $B'$ upward forms the bolster B, and constitutes a continuous connection between the oil-box $B^1$ and the top of the bolster. The tube $B^1$ is secured to the spindle-rail by means of the flanged bracket G, which is provided with bolt-holes, somewhat elongated, as shown, whereby it may be readily adjusted to the proper position on the rail.

The spindle is driven by the sleeve $D'$ and whirl D, which is connected with the spindle above the bolster, and extends downward, encircling the bolster and tube to a point near the flanged bracket G. Instead of driving the bobbin H by means of a collar upon the spindle or the spindle itself above the sleeve, as heretofore, we drive it by means of the sleeve $D'$, on which the bobbin rests, the upper portion of the spindle above the bolster serving to maintain the bobbin in a truly vertical position. By driving the bobbin by the sleeve D′ we are enabled to bring the bobbin very near the bolster. To connect the bobbin with the sleeve D′ we employ on said sleeve the pins *h*, which enter corresponding apertures in the bobbin. The oil-box B′ between the bolster and step is directly connected with the bolster to prevent the escape of the oil as it is supplied to the bolster. At the upper end of the bolster B the wall *b* is between the bearing of the bolster and oil-cup C. The latter has the downward passage *a* leading to the bearing of the bolster, at a point below the oil-cup, which enables the oil which overflows the bolster B by the rotations of the spindle A raising it from the oil-box below to escape downward into the bolster, by which means a constant circulation of the oil is obtained without allowing it to escape, except into the oil-box B′, and the oil-cup C is prevented from overflowing. A slot, *c*, is made in the wall *b* to allow a portion of the oil in the bolster to flow into the cup C before it reaches the top of the bolster, as, if the overflow of oil at the top of the bolster be not thus checked, it may be in such quantity that some part of it may be thrown off and wasted by the centrifugal force of the spindle. The slot *c* also admits the oil in the cup C to the rotating spindle at the top of the bolster. The sleeve D′, near its upper end, is provided with a lateral induction oiling-passage, as at *d*, whereby oil may be readily supplied without lifting the spindle. It is of value that this oil-passage be guarded against the entrance of dust and dirt, and we therefore provide the guard E, which consists of a movable metallic cap surrounding the sleeved whirl. In order to supply the oil without wholly removing the guard, we provide therein an aperture, as at *e*, which, when placed in coincidence with the lateral opening at *d* in the sleeved whirl, renders the latter accessible to the tube of an oil can or cup. A turn of the guard removes the opening *e*, and thereby closes the lateral opening *d*. The cup C is provided at or near its rim with a circumferential groove, *g*, which serves to catch and return to the cup any oil projected by the centrifugal action of spindle. The set-screw at F is entered through the tube near its lower end, and extends within a circumferential groove, *i*, in the spindle. This screw is provided next to its head with an elastic packing, as at K, which prevents any leakage or escape of oil at that point.

Having thus described our invention, we claim—

1. In combination, the tube B′ and bolster B, projecting upward, as described, the live spindle A, which extends above the bolster for receiving the bobbin, and the sleeve D′, which encircles the bolster, is connected with the spindle above the bolster, and sustains and drives the bobbin.

2. The combination, with a tube having a step and a bolster for a spindle, of the flanged bracket provided with bolt-holes, substantially as described, whereby the tube and the several parts sustained by it may be readily adjusted on a spindle-rail.

3. The bolster B and the oil-box B′, closed at its lower end, and surrounding the spindle, in combination with the spindle A, and annular oil-reservoir C surrounding it at the top of the bolster, and provided with the return-passage *a*, substantially as described.

4. The combination of the oil-chamber, the spindle, and the sleeved whirl, having the lateral oiling-passage *d*, substantially as described, whereby, without lifting the whirl or spindle, oil may be readily supplied.

5. The combination of the sleeved whirl, having the lateral oiling-passage, with a movable guard for closing said oil-passage.

6. In combination with the spindle and tube, the set-screw F and packing K, substantially as described.

7. The spindle A and oil-box B′, in combination with the bolster B, provided with the oil-passage *a*, and the oil-cup C, provided with the slot *c*, substantially as described.

8. The combination of the oil-box B′, surrounding the spindle, and closed at the bottom, the bolster B, the spindle A, and the oil-cup C, provided with the slot *c*, substantially as described.

FRANCIS J. RABBETH.
JOHN E. ATWOOD.

Witnesses for RABBETH:
A. J. SHIPPEE,
F. C. BANCROFT.
Witnesses for ATWOOD:
EUGENE ATWOOD,
J. H. MORRISON.